United States Patent
Han et al.

(10) Patent No.: US 9,667,949 B2
(45) Date of Patent: May 30, 2017

(54) DISPLAY APPARATUS FOR VISUAL AND AUDIO MULTIPLEXED DISPLAY

(71) Applicant: SAMSUNG ELECTRONICS CO., LTD., Suwon-si (KR)

(72) Inventors: Seung-hoon Han, Seoul (KR); Hong-pyo Kim, Goyang-si (KR); Hye-jin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 636 days.

(21) Appl. No.: 14/090,665

(22) Filed: Nov. 26, 2013

(65) Prior Publication Data

US 2014/0267638 A1    Sep. 18, 2014

(30) Foreign Application Priority Data

Mar. 15, 2013 (KR) .......................... 10-2013-0028237

(51) Int. Cl.
| | |
|---|---|
| G06F 17/00 | (2006.01) |
| H04N 13/04 | (2006.01) |
| H04R 1/34 | (2006.01) |
| H04R 1/36 | (2006.01) |

(52) U.S. Cl.
CPC ....... *H04N 13/0402* (2013.01); *H04N 13/047* (2013.01); *H04R 1/345* (2013.01); *H04R 1/36* (2013.01); *H04N 2013/0463* (2013.01); *H04R 2217/03* (2013.01)

(58) Field of Classification Search
CPC ................................................ H04R 2499/15
See application file for complete search history.

(56) References Cited

U.S. PATENT DOCUMENTS

| | | | | |
|---|---|---|---|---|
| 2006/0147065 A1* | 7/2006 | Kim | ......................... | H04R 7/06 381/152 |
| 2007/0104341 A1* | 5/2007 | Kondo | .................... | G06T 7/004 381/306 |

(Continued)

FOREIGN PATENT DOCUMENTS

| | | |
|---|---|---|
| KR | 20080022589 A | 3/2008 |
| KR | 20100080032 A | 7/2010 |

(Continued)

OTHER PUBLICATIONS

Zixian Liang, et al., "Extreme Acoustic Metamaterial by Coiling Up Space", American Physical Society, Mar. 16, 2012, p. 114301-1-114301-4.

*Primary Examiner* — Thomas Maung
(74) *Attorney, Agent, or Firm* — Sughrue Mion, PLLC

(57) ABSTRACT

A display apparatus for visual and audio multiplexed display may include a directive display unit configured to display a plurality of pieces of visual information toward a corresponding plurality of locations, wherein each of the plurality of pieces of visual information is output toward a specific location of the plurality of locations. The display apparatus may also include a directive speaker unit configured to transmit a plurality of pieces of audio information toward the plurality of locations, wherein each of the plurality of pieces of audio information is output toward a specific location of the plurality of locations, and a central control unit configured to control the directive display unit and the directive speaker unit.

18 Claims, 9 Drawing Sheets

(56) References Cited

U.S. PATENT DOCUMENTS

2008/0165992 A1* 7/2008 Kondo ................. H04N 7/0122
                                                       381/182
2008/0278805 A1* 11/2008 Schwerdtner ...... H04N 13/0402
                                                       359/463
2012/0061176 A1* 3/2012 Tanielian ............. G10K 11/162
                                                       181/207

FOREIGN PATENT DOCUMENTS

| KR | 20100114334 A | 10/2010 |
|----|---------------|---------|
| KR | 20120055179 A | 5/2012  |

* cited by examiner

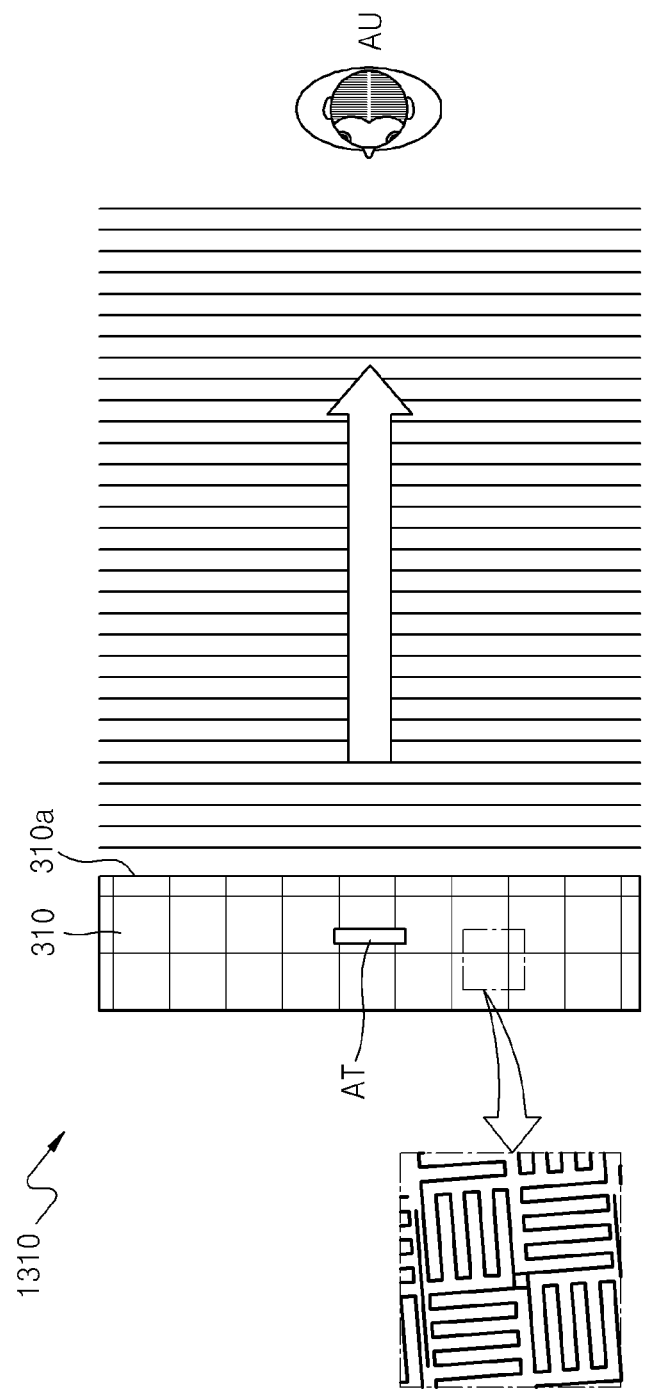

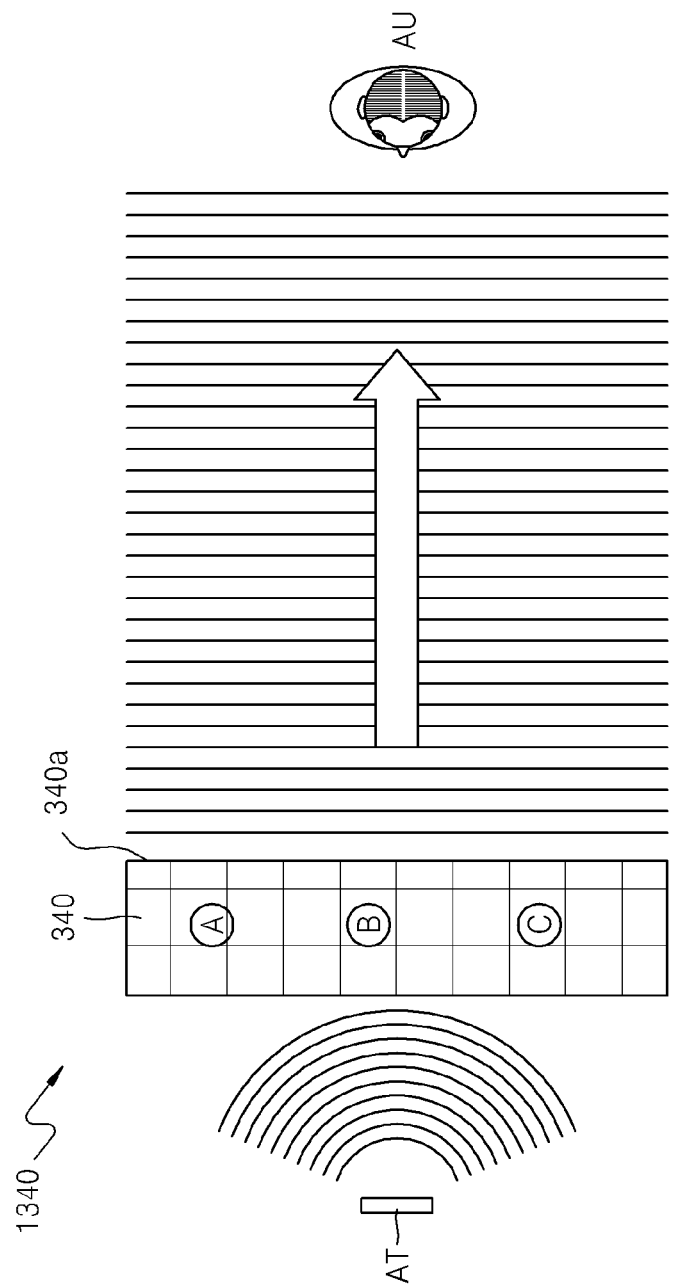

DISPLAY APPARATUS FOR VISUAL AND AUDIO MULTIPLEXED DISPLAY

CROSS-REFERENCE TO RELATED APPLICATION

This application claims priority from Korean Patent Application No. 10-2013-0028237, filed in the Korean Intellectual Property Office on Mar. 15, 2013, the disclosure of which is incorporated herein in its entirety by reference.

BACKGROUND

1. Field

Apparatuses and methods consistent with exemplary embodiments relate to display apparatuses for visual and audio multiplexed display.

2. Description of the Related Art

Recently, along with an increase in an interest in information display and an increase in requests for using a portable information medium, the utilization of a display apparatus is very high.

Typical display apparatuses are designed for several users to view one image and are produced for several users to view a same high-quality image in different directions.

There are also demands for each of users to view different information from a same display apparatus. For example, a driver in a vehicle may desire to view satellite navigation data, whereas a fellow rider may desire to view a movie.

These conflicting demands may be satisfied by a multi-view display giving different directivities to displays of different pieces of information. In this case, a user may use earphones to obtain audio information corresponding to the displays of different pieces of information or may desire to directly obtain the audio information from a speaker. In this case, directivity of the speaker may satisfy this demand.

SUMMARY

One or more exemplary embodiments provide display apparatuses for visual and audio multiplexed display.

According to an aspect of an exemplary embodiment, there is provided a display apparatus for visual and audio multiplexed display that may include a directive display unit configured to display a plurality of pieces of visual information toward a corresponding plurality of locations, wherein each of the plurality of pieces of visual information is output toward a specific location of the plurality of locations; a directive speaker unit configured to transmit a plurality of pieces of audio information toward the plurality of locations, wherein each of the plurality of pieces of audio information is output toward a specific location of the plurality of locations; and a central control unit configured to control the directive display unit and the directive speaker unit.

The directive speaker unit may include: at least one sound wave generator configured to generate a wave, wherein the wave is at least one of a sound wave and an ultrasound wave carrying the first piece of audio information; and at least one acoustic meta-structure body having directivity configured to collimate the wave generated by the sound wave generator toward one direction by at least one of diverging the wave generated by the sound wave generator by a radiation angle within about 30°, and converging the wave generated by the sound wave generator into one point.

The sound wave generator may include a first sound wave generator that generates a first wave corresponding to a first piece of audio information, wherein the at least one acoustic meta-structure body may include a first acoustic meta-structure body that transmits the first wave generated by the first sound wave generator toward a first direction corresponding to the first piece of audio information, wherein the at least one sound wave generator comprises a second sound wave generator that generates a second wave corresponding to a second piece of audio information, and wherein the at least one acoustic meta-structure body comprises a second acoustic meta-structure body that transmits the second wave generated by the second sound wave generator toward a second direction corresponding to the second piece of audio information.

The at least one acoustic meta-structure body may include a plurality of meta-units having a structure of a coil shape configured to shape a traveling path of the wave generated by the sound wave generator.

Each of the plurality of meta-units may include: an incident part that receives a wave; an output part that outputs the wave; and a plurality of channels forming a traveling path for the wave, the plurality of channels being disposed between the incident part and the output part, and are connected to one another.

A linear distance between the incident part and the output part may be shorter than a wavelength of the wave generated by the sound wave generator.

The plurality of channels may be formed by a plate structure that partitions an air space in each of the plurality of meta-units.

The plate structure may be formed of copper, aluminum, steel, or polymer.

Each of the plurality of meta-units included in the acoustic meta-structure body may have a same structure.

The acoustic meta-structure body may have a structure in which a refractive index is near zero in a wavelength band of the wave generated by the sound wave generator, and in this case, the sound wave generator may be disposed inside the acoustic meta-structure body.

The wave generated by the sound wave generator may be an ultrasound wave, wherein the ultrasound wave, after being output from the acoustic meta-structure body, may be converted to an audible frequency band when hitting an audience or an object near the audience.

The plurality of meta-units may include a plurality of meta-units having different structures shaping a traveling path of the wave generated by the sound wave generator in different coil shapes.

Each of the plurality of meta-units may have a structure including a graded index distribution gradually varying from a center part of the meta-structure body to an edge of the meta-structure body, and in this case, the sound wave generator may be disposed outside of the acoustic meta-structure body.

The wave generated by the sound wave generator may be an ultrasound wave, wherein the ultrasound wave, after being output from the acoustic meta-structure body, may be converted to an audible frequency band when hitting an audience or an object nearby the audience.

The display apparatus may further include a location tracking sensor that senses a location of an audience, wherein the central control unit receives audience location information from the location tracking sensor.

The display apparatus may further include a speaker control unit that receives the audience location information from the central control unit and adjusts directivity of the acoustic meta-structure body.

The speaker control unit may apply an electric field, heat, or strain to the acoustic meta-structure body to adjust the directivity of the acoustic meta-structure body.

The directive display unit may include: an illumination unit that provides light for forming an image; a display panel that modulates the light from the illumination unit according to image information; and a variable optical device that forms directivity of an image formed by the display panel.

The display apparatus may further include a display control unit that drives pixels of the display panel by space multiplexing a plurality of pieces of the image information, wherein the illumination unit includes a plurality of point light sources.

The display apparatus may further include a display control unit that drives pixels of the display panel by time multiplexing a plurality of pieces of the image information.

The display apparatus may further include a location tracking sensor for sensing a location of an audience, wherein the central control unit receives audience location information from the location tracking sensor, and the display control unit adjusts directivity of the variable optical device by receiving the audience location information from the central control unit.

Additional aspects will be set forth in part in the description which follows and, in part, will be apparent from the description, or may be learned by practice of the presented embodiments.

BRIEF DESCRIPTION OF THE DRAWINGS

These and other aspects will become apparent and more readily appreciated from the following description of the exemplary embodiments, taken in conjunction with the accompanying drawings in which:

FIG. 2 is a schematic configuration of a directive speaker unit, which may be employed in the display apparatus of FIG. 1, according to an exemplary embodiment;

FIG. 6 is a schematic configuration of a directive speaker unit, which may be employed in the display apparatus of FIG. 1, according to another exemplary embodiment;

DETAILED DESCRIPTION

Figure 1:
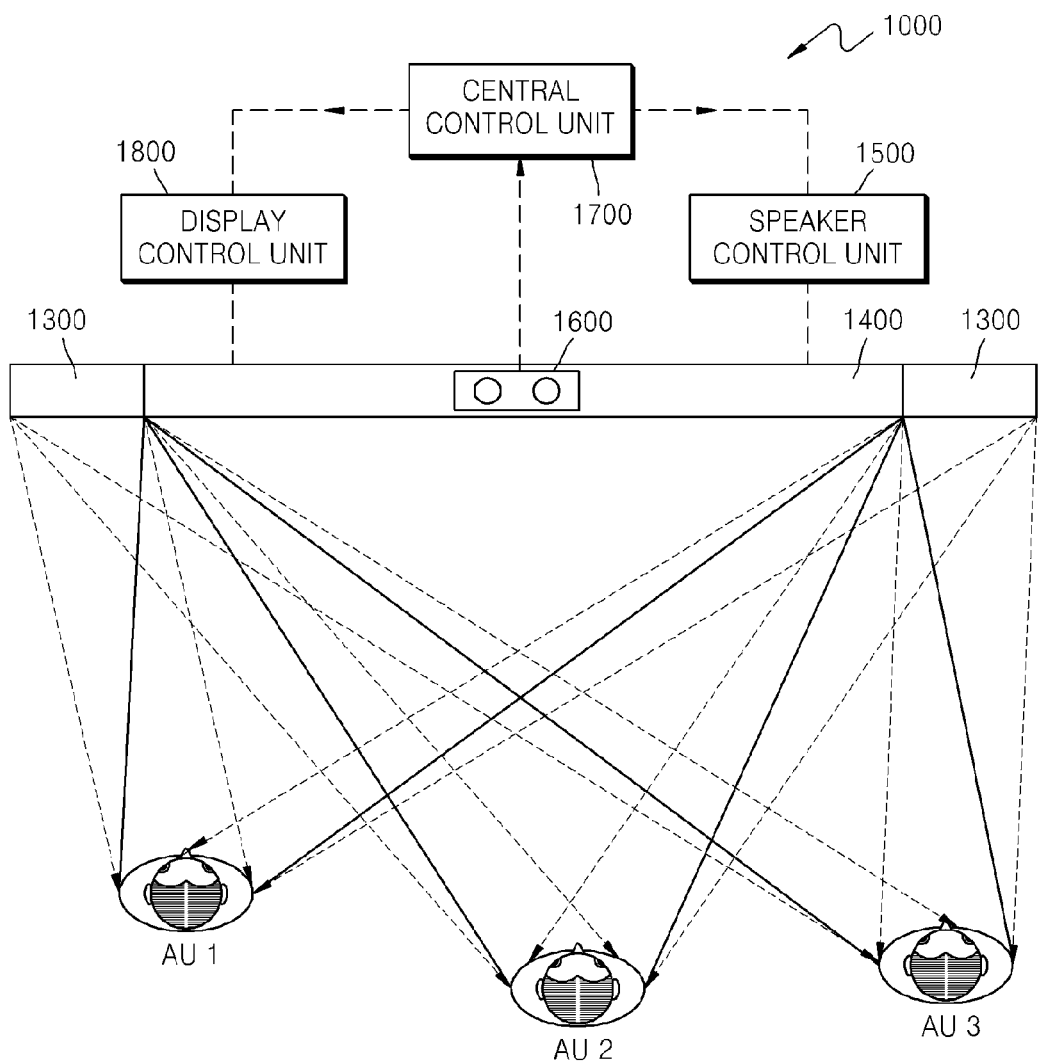
FIG. 1 is a conceptual diagram of a schematic configuration of a display apparatus for visual and audio multiplexed display, according to an exemplary embodiment.

Reference will now be made in detail to embodiments, examples of which are illustrated in the accompanying drawings, wherein like reference numerals refer to the like elements throughout the drawings, and sizes of the elements in the drawings may be exaggerated for clarity and convenience of description. In this regard, the present embodiments may have different forms and should not be construed as being limited to the descriptions set forth herein. Accordingly, the embodiments are described below, by referring to the figures, to explain aspects of the present description. As used herein, expressions such as "at least one of," when preceding a list of elements, modify the entire list of elements and do not modify the individual elements of the list.

FIG. 1 is a conceptual diagram of a schematic configuration of a display apparatus 1000 for visual and audio multiplexed display, according to an exemplary embodiment.

The display apparatus 1000 is a device for displaying different pieces of visual and audio information toward a plurality of audience locations. For example, different pieces of visual and audio information are provided toward a first audience location AU1, a second audience location AU2, and a third audience location AU3. To this end, the display apparatus 1000 may include a directive display unit 1400 for displaying different pieces of visual information toward a plurality of locations, a directive speaker unit 1300 for transmitting different pieces of audio information toward the plurality of locations, and a central control unit 1700 for controlling the visual information from the directive display unit 1400 and the audio information from the directive speaker unit 1300 to be oriented to the plurality of locations.

The display apparatus 1000 may include a display control unit 1800 for controlling the directive display unit 1400 and a speaker control unit 1500 for controlling the directive speaker unit 1300.

The display apparatus 1000 may include a location tracking sensor 1600 for sensing a location of an audience. The central control unit 1700 may receive audience location information from the location tracking sensor 1600 and transmit the received audience location information to the speaker control unit 1500 and the display control unit 1800.

The speaker control unit 1500 and the display control unit 1800 respectively drive the directive speaker unit 1300 and the directive display unit 1400 so that the directive speaker unit 1300 and the directive display unit 1400 have directivity suitable for the audience location information received from the central control unit 1700.

Illustrative configurations of the directive speaker unit 1300 and the directive display unit 1400 included in the display apparatus 1000 will now be described.

Figure 3A:
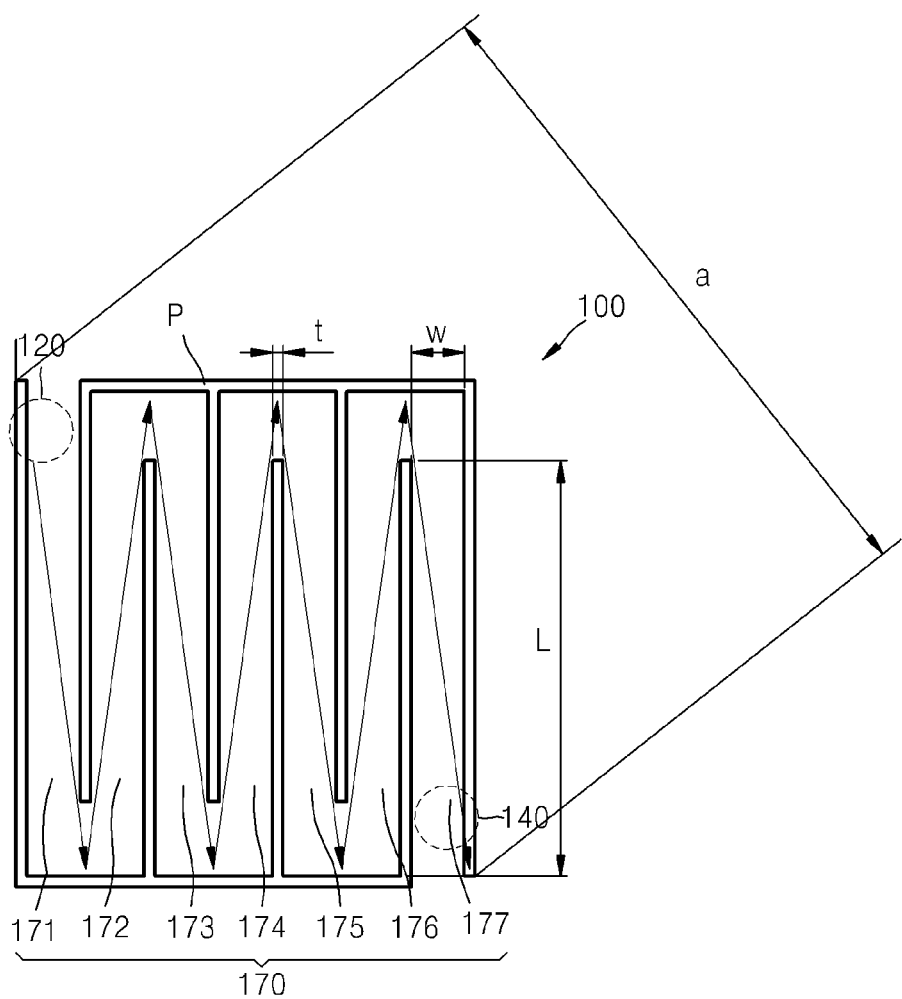
FIG. 3A is a magnified cross-sectional view of one of a plurality of meta units forming an acoustic meta-structure body used in the directive speaker unit of FIG. 2, according to an exemplary embodiment.

FIG. 2 is a schematic configuration of a directive speaker unit 1310, which may be employed in the display apparatus 1000 of FIG. 1, according to an exemplary embodiment. FIG. 3A is a magnified cross-sectional view of one of a plurality of meta units 100 forming an acoustic meta-structure body 310 used in the directive speaker unit 1310 of FIG. 2, according to an exemplary embodiment, and FIG.

3B is a cross-sectional view of a structure in which four meta units 210, 220, 230, and 240 form one cell 200, according to an exemplary embodiment.

Referring to FIG. 2, the directive speaker unit 1310 may include a sound wave generator AT for generating a sound wave or an ultrasound wave carrying audio information thereon and the acoustic meta-structure body 310 for collimating the sound wave generated by the sound wave generator AT toward one direction.

A meta material is a material exhibiting a refractive index characteristic, which does not exist in the natural world and is an artificial atom unit including various forms of patterns having dimensions of sub-wavelength order. Meta materials also may provide sub-wavelength focusing, negative refraction, extraordinary transmission, and invisibility cloaking, with respect to an electromagnetic wave, a sound wave, or an ultrasound wave. Examples of meta materials with respect to an electromagnetic wave, such as light, are a photonic crystal and a plasmonic structure. Examples of meta materials with respect to a sound wave, or an ultrasound wave, are an acoustic crystal and a resonator-based or coil-based structure.

In the current embodiment, a meta material having high efficiency in a low frequency band, such as a sound wave or an ultrasound wave, is employed. The acoustic meta-structure body 310 may include the plurality of meta units 100, as shown in FIG. 3A, having a structure in which a traveling path of a wave is in a coil shape.

Referring to FIG. 3A, the meta unit 100 may include an incident part 120 into which a wave is incident, an output part 140 from which the wave is output, and a channel portion 170 that includes a plurality of channels 171, 172, 173, 174, 175, 176, and 177 connected to each other to form a traveling path for the incident wave and disposed between the incident part 120 and the output part 140. A traveling direction of the wave may vary inside the plurality of channels 171, 172, 173, 174, 175, 176, and 177, and a sum of the traveling directions of the wave traveling in the plurality of channels 171, 172, 173, 174, 175, 176, and 177 may be the same as a direction from the incident part 120 to the output part 140. The direction from the incident part 120 to the output part 140 is referred to as an effective traveling direction or linear path having a length a.

The plurality of channels 171, 172, 173, 174, 175, 176, and 177 may be formed by a plate structure P for partitioning an air space, and the plate structure P may be formed of a metal, such as copper, aluminum, or steel, or a polymer.

A linear distance a between the incident part 120 and the output part 140 is shorter than a wavelength of the wave generated by the sound wave generator AT, and the meta unit 100 has a structure which creates a coiling path between the incident part 120 and the output part 140. The meta unit 100 may exhibit various refractive index characteristics according to frequency bands due to the coiling of the path formed between the incident part 120 and the output part 140 pattern and a channel width w, a channel length L, and a thickness t of the plate structure P.

The meta unit 100 forms the coiling path in a zigzag shape. That is, traveling paths of the wave in adjacent channels among the plurality of channels 171, 172, 173, 174, 175, 176, and 177 are different. In addition, the meta unit 100 may have a structure in which a refractive index is near zero in a frequency band of the wave generated by the sound wave generator AT. When a wave is output in such structure of a near zero index, the wave is modulated so that a wave surface is parallel to an output surface 310a. That is, the wave is collimated in a direction orthogonal to the output surface 310a.

Figure 3B:
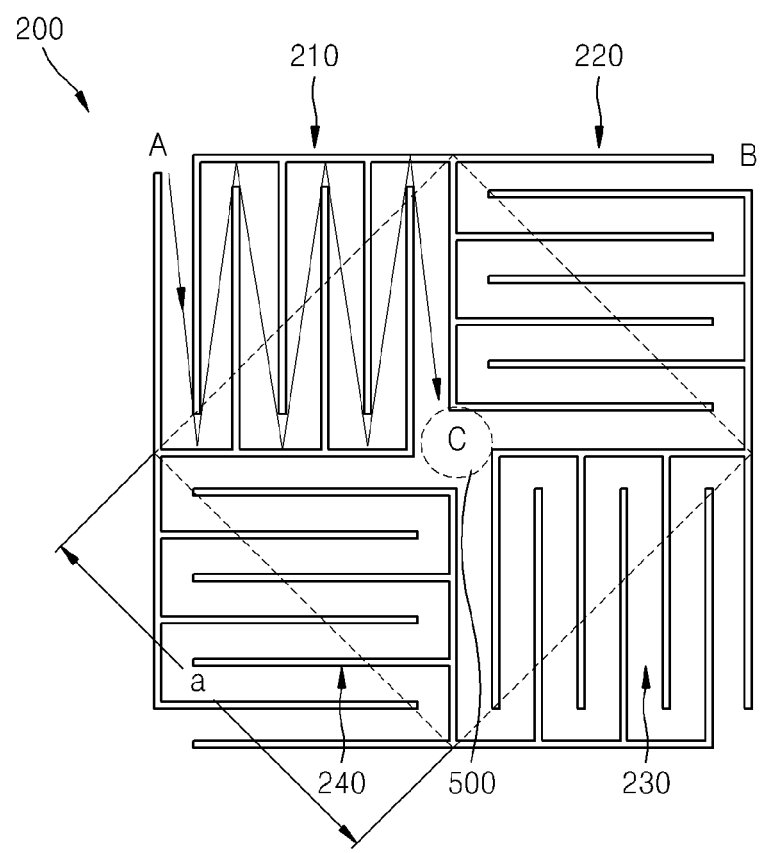
FIG. 3B is a cross-sectional view of a structure in which four meta units form one cell, according to an exemplary embodiment.

In addition, as shown in FIG. 3B, one cell 200 may be formed by combining first to fourth meta units 210, 220, 230, and 240 having different effective traveling directions of a wave. As shown in FIG. 2, the acoustic meta-structure body 310 may include a plurality of cells 200.

Although the one cell 200 in FIG. 3B is formed by combining the first to fourth meta units 210, 220, 230, and 240 for convenience of description, the current embodiment is not limited thereto.

The first to fourth meta units 210, 220, 230, and 240 allow an incident wave to travel in a zigzag pattern by coiling a linear path as described with respect to the meta unit 100 of FIG. 3A.

One end of each of the first to fourth meta units 210, 220, 230, and 240 is disposed in a central region C of the cell 200, and those ends connect to one other. The first to fourth meta units 210, 220, 230, and 240 may be disposed to be rotationally symmetrical to each other around the central region C. For example, the first to fourth meta units 210, 220, 230, and 240 may be disposed so that the first meta unit 210 matches the second meta unit 220 when the first meta unit 210 is rotated by 90° around the central region C, the second meta unit 220 matches the third meta unit 230 when the second meta unit 220 is rotated by 90° around the central region C, the third meta unit 230 matches the fourth meta unit 240 when the third meta unit 230 is rotated by 90° around the central region C, and the fourth meta unit 240 matches the first meta unit 210 when the fourth meta unit 240 is rotated by 90° around the central region C. That is, the first and third meta units 210 and 230 may be disposed to be symmetrical around the central region C, and the second and fourth meta units 220 and 240 may be disposed to be symmetrical around on the central region C. An effective traveling direction of a wave in the first meta unit 210 may be the same as that in the third meta unit 230, and an effective traveling direction of a wave in the second meta unit 220 may be the same as that in the fourth meta unit 240.

A wave incident into the cell 200 may be output to the outside after traveling through at least one of the first to fourth meta units 210, 220, 230, and 240. For example, a wave incident from the outside to the first meta unit 210 is dispersed to the second to fourth meta units 220, 230, and 240 at the central region C after traveling through the first meta unit 210. The dispersed waves may respectively travel through the second to fourth meta units 220, 230, and 240 and be output to the outside. According to characteristics of an incident wave, the incident wave may be dispersed to all or only some of the other meta units.

The sound wave generator AT may generate a sound wave or an ultrasound wave carrying audio information thereon. When the sound wave generator AT generates an ultrasound wave, the ultrasound wave, which is collimated and output by the acoustic meta-structure body 310, may be converted to an audible frequency band, for example, upon hitting an audience or an object nearby the audience.

Figure 4:
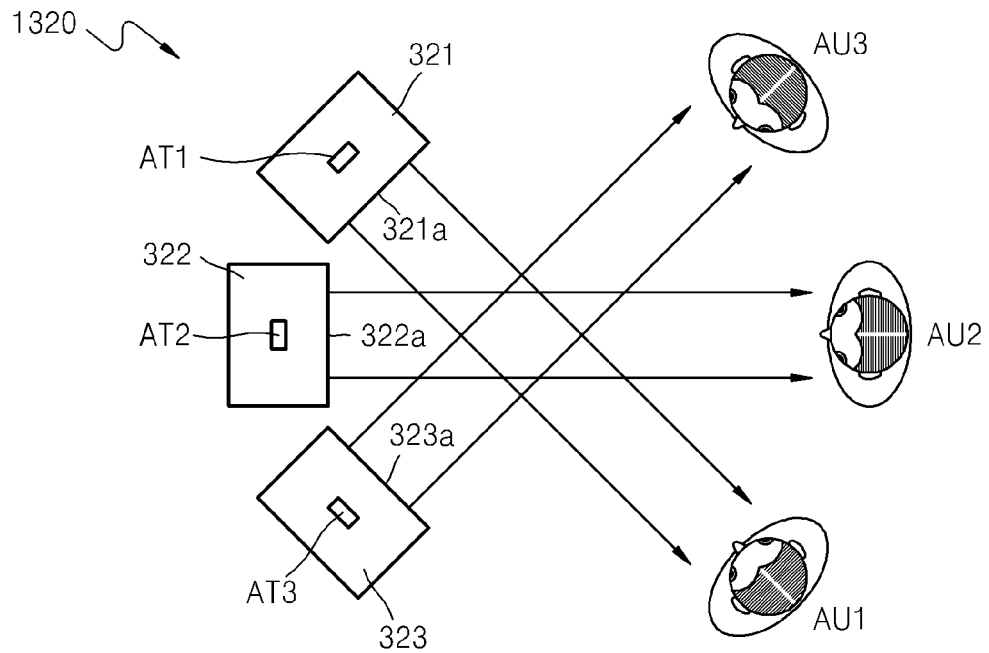
FIG. 4 is a schematic configuration of a directive speaker unit, which may be employed in the display apparatus of FIG. 1, according to another exemplary embodiment.

FIG. 4 is a schematic configuration of a directive speaker unit 1320, which may be employed in the display apparatus 1000 of FIG. 1, according to another exemplary embodiment.

The directive speaker unit 1320 may include a first acoustic meta-structure body 321, a first sound wave generator AT1 disposed inside the first acoustic meta-structure body 321, a second acoustic meta-structure body 322, a second sound wave generator AT2 disposed inside the second acoustic meta-structure body 322, a third acoustic meta-structure body 323, and a third sound wave generator AT3 disposed inside the third acoustic meta-structure body 323. The first to third acoustic meta-structure bodies 321, 322, and 323 may have the same structure as that of the acoustic meta-structure body 310 of FIG. 2, i.e., a structure including a plurality of meta units exhibiting a near zero index, and normal lines of output surfaces 321a, 322a, and 323a of the first to third acoustic meta-structure bodies 321, 322, and 323 are disposed to be oriented to a plurality of first to third sound wave generators AT1, AT2, and AT3, respectively.

The first to third sound wave generators AT1, AT2, and AT3 generate waves carrying different pieces of audio information thereon, and the generated waves are collimated to have wave surfaces parallel to the output surfaces 321a, 322a, and 323a of the first to third acoustic meta-structure bodies 321, 322, and 323 and are output, respectively. Accordingly, the waves generated by the first to third sound wave generators AT1, AT2, and AT3 arrive at the first to third audience locations AU1, AU2, and AU3, respectively.

Figure 5:
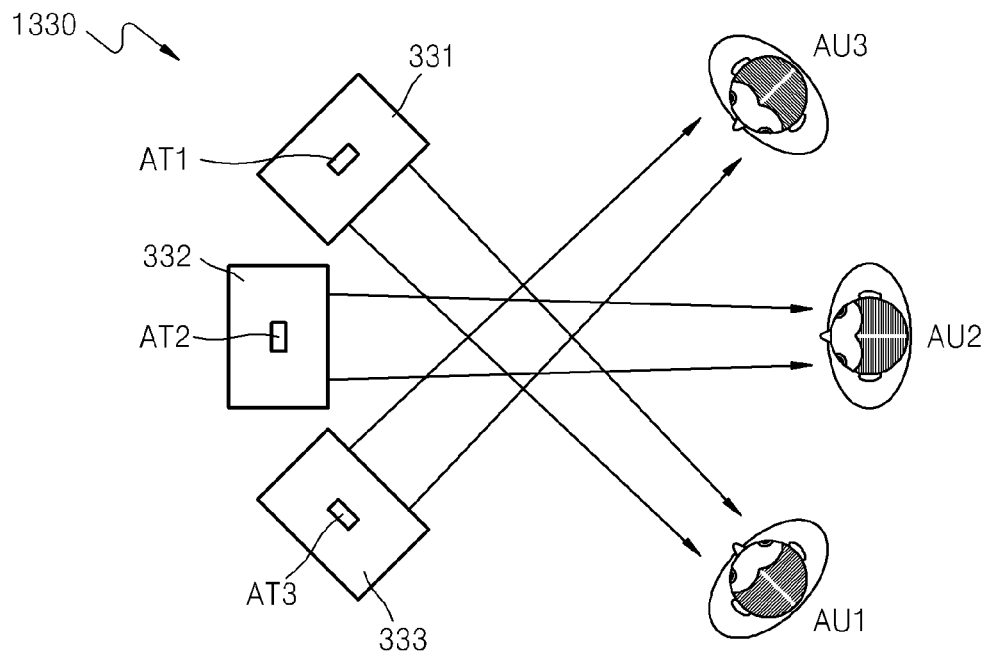
FIG. 5 is a schematic configuration of a directive speaker unit, which may be employed in the display apparatus of FIG. 1, according to another exemplary embodiment.

FIG. 5 is a schematic configuration of a directive speaker unit 1330, which may be employed in the display apparatus 1000 of FIG. 1, according to another exemplary embodiment.

The directive speaker unit 1330 may include a first acoustic meta-structure body 331, the first sound wave generator AT1 disposed inside the first acoustic meta-structure body 331, a second acoustic meta-structure body 332, the second sound wave generator AT2 disposed inside the second acoustic meta-structure body 332, a third acoustic meta-structure body 333, and the third sound wave generator AT3 disposed inside the third acoustic meta-structure body 333. Each of the first to third acoustic meta-structure bodies 331, 332, and 333 has a structure obtained by respectively modifying the first to third acoustic meta-structure bodies 321, 322, and 323 in the embodiment of FIG. 4, i.e., a structure in which waves output from the first to third acoustic meta-structure bodies 331, 332, and 333 are converged toward a predetermined point. These structures may be obtained by modifying a coiling pattern of the meta units employed in the first to third acoustic meta-structure bodies 321, 322, and 323 of FIG. 4 or changing directivities of the first to third acoustic meta-structure bodies 321, 322, and 323 of FIG. 4 by applying an electric field, heat, or strain from the outside to the same structure as that of the first to third acoustic meta-structure bodies 321, 322, and 323 of FIG. 4.

Although FIGS. 4 and 5 illustrate that a sound wave output from an acoustic meta-structure body is collimated in one direction or converged toward one point, the acoustic meta-structure body may be formed so that the sound wave output from the acoustic meta-structure body is diverged by a small radiation angle within a predetermined range, e.g., a radiation angle within about 30°.

Figure 7A:
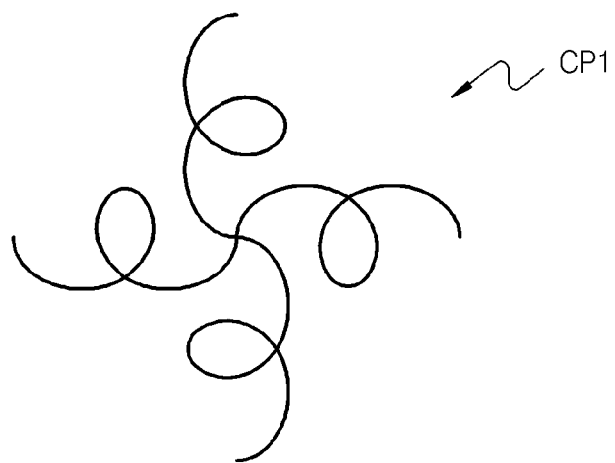
FIGS. 7A to 7C illustrate coil patterns of meta units disposed at three locations of an acoustic meta-structure body used in the directive speaker unit of FIG. 6, according to an exemplary embodiment.
Figure 7B:
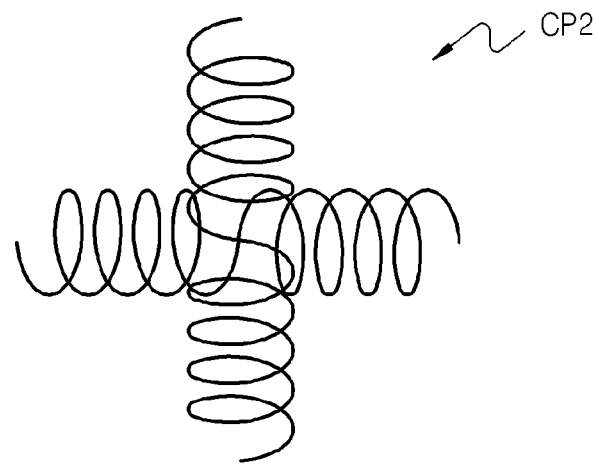
Figure 7C:
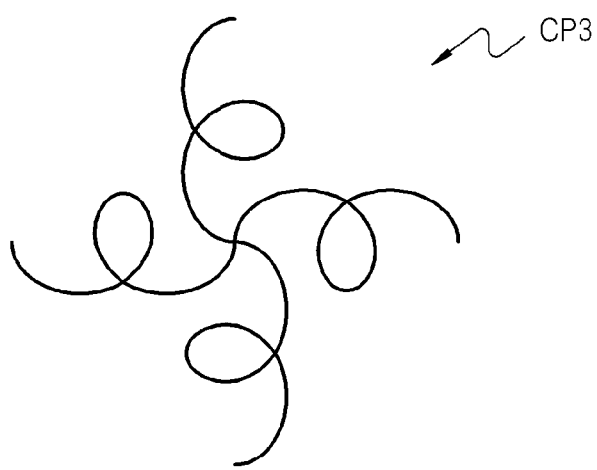

FIG. 6 is a schematic configuration of a directive speaker unit 1340, which may be employed in the display apparatus 1000 of FIG. 1, according to another exemplary embodiment. FIGS. 7A to 7C illustrate coil patterns CP1, CP2, and CP3 of meta units that may be disposed at one or more of three locations A, B, and C of an acoustic meta-structure body 340 used in the directive speaker unit 1340 of FIG. 6, according to an one or more exemplary embodiments.

Referring to FIG. 6, the directive speaker unit 1340 may include the acoustic meta-structure body 340 and a sound wave generator AT disposed at one side of the outside of the acoustic meta-structure body 340.

The acoustic meta-structure body 340 may have a structure in which a wave generated by the sound wave generator AT, which is incident in the form of a spherical wave, is transformed into a wave having a wave surface parallel to an output surface 340a structure by including a plurality of meta units which output the wave by coiling a path of the wave. To this end, the acoustic meta-structure body 340 may include a plurality of meta units having different structures for shaping a traveling path of the wave generated by the sound wave generator AT according to different coil shapes. In addition, a structure of each of the plurality of meta units may be determined so that the acoustic meta-structure body 340 has a graded index distribution gradually varying from a center part to an edge thereof for the wave generated by the sound wave generator AT. For example, a meta unit having a large coiling grade may be disposed at the center part of the acoustic meta-structure body 340, and a meta unit having a smaller coiling grade may be disposed toward the edge.

FIG. 7A illustrates the coil pattern CP1, which may be employed by a meta unit at the location A in the acoustic meta-structure body 340, and FIGS. 7B and 7C illustrate the coil patterns CP2 and CP3, which may be employed by meta units at the locations B and C, respectively. However, the detailed shapes of the shown coil patterns CP1, CP2, and CP3 are only illustrative and may be modified to other shapes.

Figure 8:
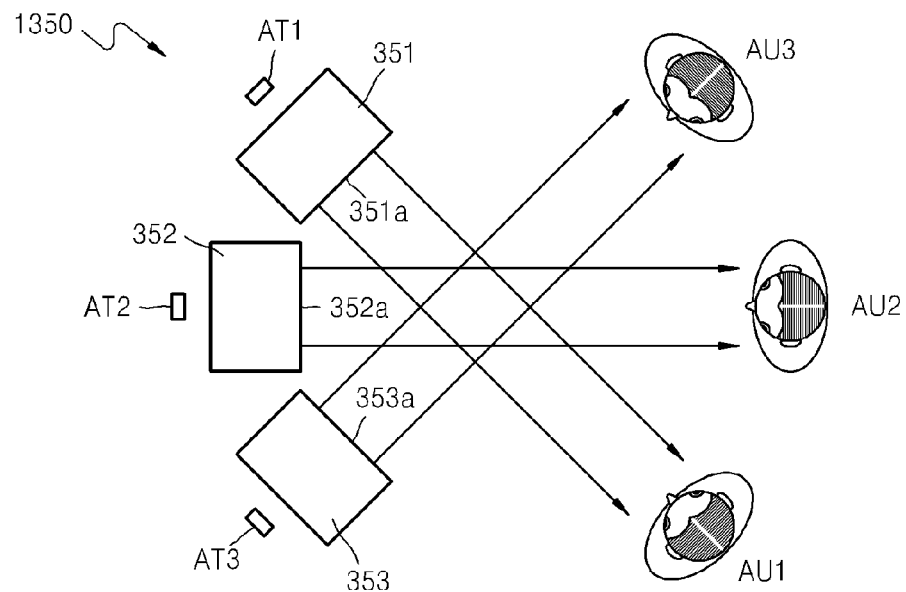
FIG. 8 is a schematic configuration of a directive speaker unit, which may be employed in the display apparatus of FIG. 1, according to another exemplary embodiment.

FIG. 8 is a schematic configuration of a directive speaker unit 1350, which may be employed in the display apparatus 1000 of FIG. 1, according to another exemplary embodiment.

The directive speaker unit 1350 may include a first acoustic meta-structure body 351, the first sound wave generator AT1 disposed at one side of the outside of the first acoustic meta-structure body 351, a second acoustic meta-structure body 352, the second sound wave generator AT2 disposed at one side of the outside of the second acoustic meta-structure body 352, a third acoustic meta-structure body 353, and the third sound wave generator AT3 disposed at one side of the outside of the third acoustic meta-structure body 353.

The first to third acoustic meta-structure bodies 351, 352, and 353 may each have the same structure as that of the acoustic meta-structure body 340 of FIG. 6. That is, each of the first to third acoustic meta-structure bodies 351, 352, and 353 may include a plurality of meta units disposed in a structure in which a coiling grade is smaller from a center part to an edge for each of the first to third acoustic meta-structure bodies 351, 352, and 353, and the first to third acoustic meta-structure bodies 351, 352, and 353 are disposed so that normal lines of output surfaces 351a, 352a, and 353a are oriented to different audience locations.

Figure 9:
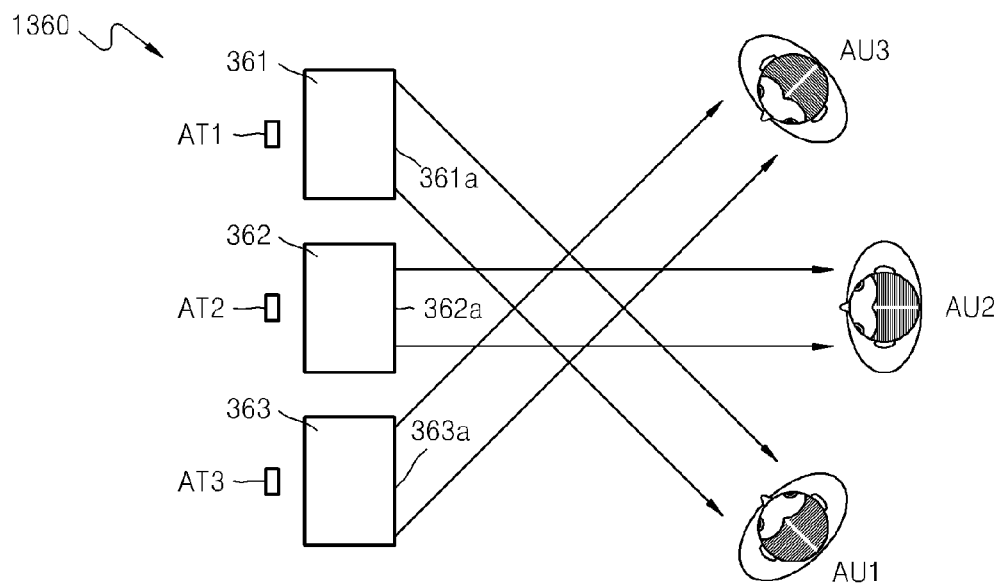
FIG. 9 is a schematic configuration of a directive speaker unit, which may be employed in the display apparatus of FIG. 1, according to another exemplary embodiment.

FIG. 9 is a schematic configuration of a directive speaker unit 1360, which may be employed in the display apparatus 1000 of FIG. 1, according to another exemplary embodiment.

The directive speaker unit 1360 may include a first acoustic meta-structure body 361, the first sound wave generator AT1 disposed at one side of the outside of the first acoustic meta-structure body 361, a second acoustic meta-structure body 362, the second sound wave generator AT2 disposed at one side of the outside of the second acoustic meta-structure body 362, a third acoustic meta-structure body 363, and the third sound wave generator AT3 disposed at one side of the outside of the third acoustic meta-structure body 363.

Output surfaces 361a, 362a, and 363a of the first to third acoustic meta-structure bodies 361, 362, and 363 are parallel to each other, and the first to third acoustic meta-structure bodies 361, 362, and 363 have different structures in which a wave surface of an incident wave of a spherical shape is differently modulated. For example, the second acoustic meta-structure body 362 may be the same as the acoustic meta-structure body 340 of FIG. 6, i.e., may include a plurality of meta units disposed in a structure in which a coiling grade is smaller from a center part of the second acoustic meta-structure body 362 to an edge. The first acoustic meta-structure body 361 may include a plurality of meta units disposed in a structure in which a coiling grade is smaller in one direction, and the third acoustic meta-structure body 363 may include a plurality of meta units disposed in a structure in which a coiling grade is smaller in a direction that is opposite to the one direction.

In addition, for the directive speaker units 1350 and 1360, a coiling pattern of the meta units is employed in the acoustic meta-structure bodies 351, 352, 353, 361, 362, and 363 so that an output wave is converged toward one point or diverged by a small radiation angle within a predetermined range, e.g., a radiation angle within about 30°. Alternatively, although the acoustic meta-structure bodies 351, 352, 353, 361, 362, and 363 having the same structures as shown in FIGS. 8 and 9 are used, directivities of the acoustic meta-structure bodies 351, 352, 353, 361, 362, and 363 may be modified by applying an electric field, heat, or strain from the outside.

Figure 10:
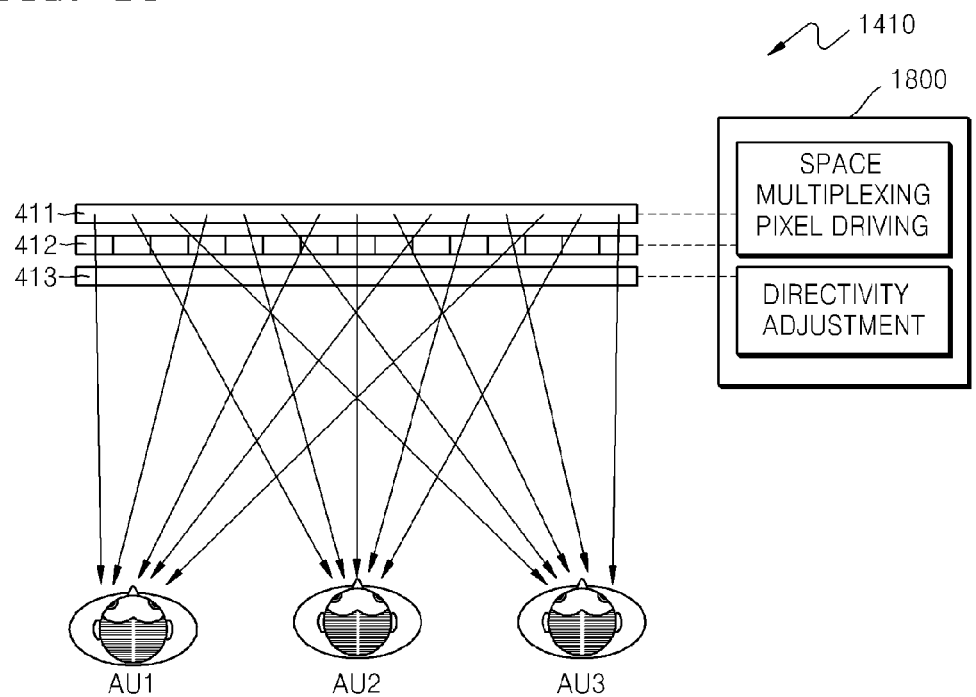
FIG. 10 is a schematic configuration of a directive display unit, which may be employed in the display apparatus of FIG. 1, according to an exemplary embodiment.

FIG. 10 is a schematic configuration of a directive display unit 1410, which may be employed in the display apparatus 1000 of FIG. 1, according to an exemplary embodiment.

The directive display unit 1410 may include an illumination unit 411 for providing light for forming an image, a display panel 412 for modulating the light from the illumination unit 411 according to image information to form an image, and a variable optical device 413 for forming directivity of the image formed by the display panel 412.

The display control unit 1800 may drive the display panel 412 by dividing pixels of the display panel 412 in a space multiplexing manner according to a plurality of pieces of image information and may also minutely adjust directivity of the variable optical device 413 according to audience location information received from the central control unit 1700, as shown in FIG. 1.

The illumination unit 411 may include a plurality of point light sources, and the plurality of point light sources and the pixels of the display panel 412 are segmented and driven to form different images toward different audience locations. That is, a portion of the plurality of point light sources and a portion of the pixels of the display panel 412 are used to form images, which are oriented to the first audience location AU1. In addition, the remaining point light sources and the remaining pixels of the display panel 412 are used to form images, which are oriented to the second and third audience locations AU2 and AU3.

Figure 11:
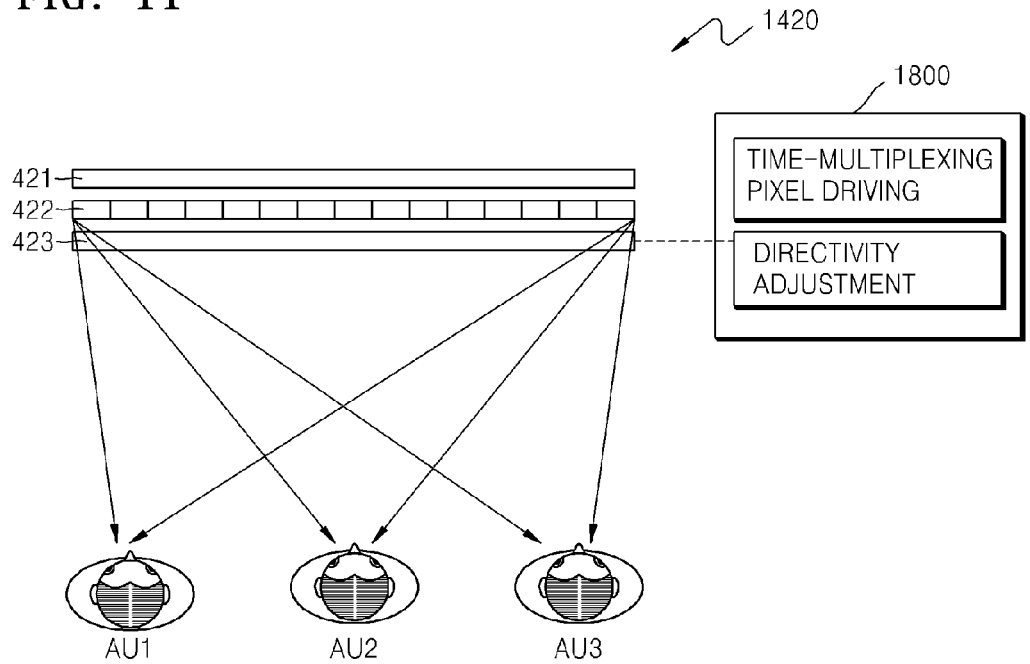
FIG. 11 is a schematic configuration of a directive display unit, which may be employed in the display apparatus of FIG. 1, according to another exemplary embodiment.

FIG. 11 is a schematic configuration of a directive display unit 1420, which may be employed in the display apparatus 1000 of FIG. 1, according to another exemplary embodiment.

The directive display unit 1420 may include an illumination unit 421 for providing light for forming an image, a display panel 422 for modulating the light from the illumination unit 421 according to image information to form an image, and a variable optical device 423 for forming directivity of the image formed by the display panel 422.

The display control unit 1800 may drive the display panel 422 by dividing pixels of the display panel 422 in a time multiplexing manner according to a plurality of pieces of image information and may also adjust directivity of the variable optical device 423 so that displays formed by time multiplexing manner are oriented to their corresponding directions.

That is, to form a display that is oriented to the first audience location AU1, the pixels of the display panel 422 are driven at a time t1 according to image information corresponding to the first audience location AU1, and to form displays that are oriented to the second and third audience locations AU2 and AU3, the pixels of the display panel 422 are driven at a subsequent time t2 and its next time t3 according to image information corresponding to the second and third audience locations AU2 and AU3, respectively. Accordingly, the variable optical device 423 is adjusted to form directivity toward the first to third audience locations AU1, AU2, and AU3 at times t1, t2, and t3, respectively. In addition, the directivity of the variable optical device 423 may be minutely adjusted according to audience location information received from the central control unit 1700 shown in FIG. 1.

As described above, according to the one or more of the above exemplary embodiments, a display apparatus for visual and audio multiplexed display may provide different pieces of visual and audio information to a plurality of audiences.

In addition, the display apparatus for visual and audio multiplexed display may include a location tracking sensor for sensing a location of an audience, and accordingly, may minutely adjust directivity of visual and audio information.

In addition, other exemplary embodiments can also be implemented through computer-readable code/instructions in/on a medium, e.g., a computer readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. The processing element could include a processor or a computer processor, and processing elements may be distributed and/or included in a single device.

While the present disclosure has been described with reference to embodiments shown in the drawings to help the understanding thereof, the embodiments are merely illustrative, and it should be understood by one of ordinary skill in the art that various modifications and other equivalent embodiments may be made therefrom. Therefore, the actual technical protection scope of the present disclosure should be defined by the appended claims.

What is claimed is:

1. A display apparatus for visual and audio multiplexed display, the display apparatus comprising:
   a directive display unit configured to display on a screen a plurality of pieces of visual information toward a corresponding plurality of locations, wherein each of the plurality of pieces of visual information is output toward a specific location of the plurality of locations;

a directive speaker unit configured to transmit a plurality of pieces of audio information toward the plurality of locations, wherein each of the plurality of pieces of audio information is output toward a specific location of the plurality of locations; and a central control unit configured to control the directive display unit and the directive speaker unit, wherein the directive speaker unit comprises:

at least one sound wave generator configured to generate a wave, wherein the wave is at least one of a sound wave and an ultrasound wave carrying the plurality of pieces of audio information, the at least one sound wave generator comprising a first sound wave generator that generates a first wave corresponding to a first piece of audio information, and a second sound wave generator that generates a second wave corresponding to a second piece of audio information;

at least one acoustic meta-structure body having directivity and configured to at least one of collimate the wave generated by the at least one sound wave generator toward one direction, diverge the wave generated by the sound wave generator by a radiation angle within about 30°, and converge the wave generated by the sound wave generator into one point, and the at least one acoustic meta-structure body comprises a first acoustic meta-structure body that transmits the first wave generated by the first sound wave generator toward a first direction corresponding to the first piece of audio information, and a second acoustic meta-structure body that transmits the second wave generated by the second sound wave generator toward a second direction corresponding to the second piece of audio information.

2. The display apparatus of claim 1, wherein the at least one acoustic meta-structure body comprises:

a plurality of meta-units having a structure of a coil shape configured to shape a traveling path of the wave generated by the sound wave generator.

3. The display apparatus of claim 2, wherein each of the plurality of meta-units comprises:

an incident part that receives a wave;

an output part that outputs the wave; and a plurality of channels forming a traveling path for the wave, wherein the plurality of channels are disposed between the incident part and the output part, and are connected to one another.

4. The display apparatus of claim 3, wherein a linear distance between the incident part and the output part is shorter than a wavelength of the wave generated by the sound wave generator.

5. The display apparatus of claim 3, wherein the plurality of channels are formed by a plate structure that partitions an air space in each of the plurality of meta-units.

6. The display apparatus of claim 2, wherein each of the plurality of meta-units included in the acoustic meta-structure body have a same structure.

7. The display apparatus of claim 6, wherein the acoustic meta-structure body has a structure in which a refractive index is near zero in a wavelength band of the wave generated by the sound wave generator.

8. The display apparatus of claim 7, wherein the at least one sound wave generator is disposed inside the acoustic meta-structure body.

9. The display apparatus of claim 7, wherein the wave generated by the at least one sound wave generator is an ultrasound wave, and wherein the ultrasound wave, after being output from the acoustic meta-structure body, is converted to an audible frequency band when hitting an audience or an object near the audience.

10. The display apparatus of claim 2, wherein the plurality of meta-units comprise meta-units having different structures with different coil shapes configured to shape the traveling path of the wave generated by the at least one sound wave generator.

11. The display apparatus of claim 10, wherein each of the plurality of meta-units has a structure comprising a graded index distribution gradually varying from a center part of the meta-structure body to an edge of the meta-structure body.

12. The display apparatus of claim 11, wherein the at least one sound wave generator is disposed outside of the acoustic meta-structure body.

13. The display apparatus of claim 11, wherein the wave generated by the at least one sound wave generator is an ultrasound wave, and wherein the ultrasound wave, after being output from the acoustic meta-structure body, is converted to an audible frequency band when hitting an audience or an object near the audience.

14. The display apparatus of claim 1, further comprising:

a location tracking sensor that senses a location of an audience, wherein the central control unit receives audience location information from the location tracking sensor.

15. The display apparatus of claim 14, further comprising:

a speaker control unit that receives the audience location information from the central control unit and adjusts directivity of the acoustic meta-structure body.

16. The display apparatus of claim 1, wherein the directive display unit comprises:

an illumination unit that provides light for forming an image;

a display panel that modulates the light from the illumination unit according to image information; and a variable optical device that forms directivity of an image formed by the display panel.

17. The display apparatus of claim 16, further comprising:

a display control unit that drives pixels of the display panel by space multiplexing a plurality of pieces of the image information.

18. The display apparatus of claim 16, further comprising:

a display control unit that drives pixels of the display panel by time multiplexing a plurality of pieces of the image information.

* * * * *